United States Patent
Liu et al.

(10) Patent No.: US 8,578,511 B2
(45) Date of Patent: Nov. 5, 2013

(54) THERMAL PROBE

(75) Inventors: Bernard HaoChih Liu, Tainan (TW);
Fang-Yi Liao, Taichung (TW);
Jian-Hong Chen, Nantou County (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 13/545,647

(22) Filed: Jul. 10, 2012

(65) Prior Publication Data
US 2013/0019353 A1 Jan. 17, 2013

(30) Foreign Application Priority Data
Jul. 12, 2011 (TW) .............................. 100124685 A

(51) Int. Cl.
*G01Q 60/38* (2010.01)
*G01Q 60/40* (2010.01)
*G01Q 60/42* (2010.01)
*G01Q 60/58* (2010.01)

(52) U.S. Cl.
CPC ................ *G01Q 60/38* (2013.01); *G01Q 60/40* (2013.01); *G01Q 60/42* (2013.01); *G01Q 60/58* (2013.01)
USPC .............................................. 850/56; 850/40

(58) Field of Classification Search
CPC ....... G01Q 60/38; G01Q 60/40; G01Q 60/42; G01Q 60/48
USPC ...................................................... 850/40, 56
See application file for complete search history.

(56) References Cited

U.S. PATENT DOCUMENTS

| | | | | |
|---|---|---|---|---|
| 5,929,438 A * | 7/1999 | Suzuki et al. | .................... | 850/50 |
| 6,215,137 B1 * | 4/2001 | Suzuki et al. | ................. | 257/254 |
| 6,518,872 B1 * | 2/2003 | Edinger et al. | .................. | 338/25 |
| 7,452,570 B1 * | 11/2008 | Cannara et al. | ............... | 427/258 |
| 7,691,541 B2 * | 4/2010 | Crocker et al. | .................... | 430/5 |
| 7,928,343 B2 * | 4/2011 | King et al. | ................. | 219/444.1 |
| 8,177,422 B2 * | 5/2012 | Kjoller et al. | .................... | 374/16 |
| 8,370,960 B2 * | 2/2013 | Proksch et al. | ................. | 850/13 |
| 8,397,555 B1 * | 3/2013 | Chand | ............................. | 73/105 |
| 8,458,810 B2 * | 6/2013 | McConney | ....................... | 850/5 |
| 2003/0202456 A1 * | 10/2003 | Hong et al. | .................... | 369/126 |
| 2008/0011065 A1 * | 1/2008 | Su et al. | ........................... | 73/105 |
| 2013/0019352 A1 * | 1/2013 | Liu et al. | .......................... | 850/50 |
| 2013/0019353 A1 * | 1/2013 | Liu et al. | .......................... | 850/50 |
| 2013/0041235 A1 * | 2/2013 | Rogers et al. | ................. | 600/306 |

* cited by examiner

*Primary Examiner* — David A Vanore
(74) *Attorney, Agent, or Firm* — Muncy, Geissler, Olds & Lowe, PLLC

(57) ABSTRACT

A thermal probe includes a support element, a conductive pattern and a tip. The support element has a slit or a through hole and has a first surface and a second surface which is opposite to the first surface. The conductive pattern is disposed at the first surface. The tip has a base and a pinpoint. The pinpoint is disposed at the base and passes through the slit or the through hole and highlights from the first surface. The base is connected with the second surface. The tip of the thermal probe of the invention can be replaced, and user can choose the best combination of the tip, conductive pattern and support element according to their needs.

10 Claims, 7 Drawing Sheets

THERMAL PROBE

CROSS REFERENCE TO RELATED APPLICATIONS

This Non-provisional application claims priority under 35 U.S.C. §119(a) on Patent Application No(s). 100124685 filed in Taiwan, Republic of China on Jul. 12, 2011, the entire contents of which are hereby incorporated by reference.

BACKGROUND OF THE INVENTION

1. Field of Invention

The present invention relates to a probe and, in particular, to a scanning thermal probe.

2. Related Art

Atomic force microscopy (AFM), also called scanning probe microscopy (SPM), includes the scanning mechanism and operation as well as the fine probe mechanism, so it has become one of the most important instruments in the fields of nano-technology and biomedical research.

FIG. 1 is a schematic diagram showing a scanning probe to detect a sample surface. As shown in FIG. 1, when the surface of a sample 11 is scanned by the probe 12, a light-emitting element 13 outputs a light beam (e.g. a laser) to irradiate a cantilever 121 of the probe 12, and the light beam is reflected and received by a light sensing element 14 (e.g. a photo diode). The control feedback circuit 15 receives the signal transformed by the light sensing element 14 and feeds back to control the movement of a scan mechanism 16 for adjusting the position of the sample 11. Accordingly, the interaction between the tip 122 and the surface of the sample 11 can be maintained at a certain value. The adjustment data for adjusting the position of the sample 11 is referring to the interaction data between the tip 122 and the surface of the sample 11, which is usually corresponding to the surface geography of the sample 11.

The bottleneck of the atomic force microscopy applied to nano-technology and biomedical research is mainly the design and fabrication of new probe. Therefore, the scan probe is the core technique of the atomic force microscopy. In addition, the scanning thermal probe microscopy (SThM) is another technology based on the atomic force microscopy. The different therebetween is that the scanning thermal probe microscopy includes a thermal probe, which can detect the temperature distribution of the sample surface. Due to this novel technology, the scale of thermal analyzing can reach micrometers or sub-micrometers.

However, the scanning thermal probe is usually manufactured by silicon MEMS processes. That is, the tip, heater and cantilever are all made of silicon materials. Although the silicon MEMS processes as well as the quality control thereof are easier, there are still limitations on the tip wearing, effective temperature range of the heater, and the highest measuring temperature. In addition, when using the tip of the thermal probe to scan, the tip and the sample surface can have interaction, which results in the wearing of the tip. If the curvature of the tip increases, the resolution of the image is affected. If the tip must be replaced for providing different functions, the conventional thermal probe does not provide the function for replacing the tip only, so that the entire thermal probe should be replaced. Besides, the conventional tip, heater and cantilever are all made of silicon material, so that the user can not select the optimum combination of the tip, heater and cantilever based on his/her requirement.

Therefore, it is an important subject to provide a thermal probe having the replaceable tip, so that the optimum combination of the tip, heater and cantilever can be selected according to the demands.

SUMMARY OF THE INVENTION

In view of the foregoing, an objective of the present invention is to provide a thermal probe having the replaceable tip, so that the optimum combination of the tip, heater and cantilever can be selected according to the demands.

To achieve the above objective, the present invention discloses a thermal probe including a support element, a conductive pattern and a tip. The support element is configured with a slit or a through hole, and has a first surface and a second surface opposite to the first surface. The conductive pattern is disposed at the first surface. The tip has a base and a pinpoint disposed at the base. The pinpoint passes through the slit or the through hole and protrudes from the first surface, and the base is connected with the second surface.

In one embodiment, the material of the conductive pattern comprises Ni—P alloy, tungsten, platinum, carbon, Ni—Cr alloy, metal oxide, metal nitride, or silicon.

In one embodiment, the manufacturing process of the conductive pattern comprises thin-film deposition, ion implantation, or focused ion beam (FIB).

In one embodiment, the material of the tip comprises diamond, TiN, Si3N4, SiC, or their combinations.

In one embodiment, the base and the pinpoint are integrally formed as one piece.

In one embodiment, the pinpoint is in contact with the conductive pattern.

In one embodiment, the tip is replaceable.

In one embodiment, the thermal probe further includes an adhesive layer disposed between the base and the second surface.

In one embodiment, the thermal probe further includes a heat isolation layer disposed on the second surface.

In one embodiment, the thermal probe further includes a heat wire disposed on the first surface and electrically connected with the conductive pattern.

As mentioned above, the thermal probe of the present invention includes a support element, a conductive pattern and a tip, the support element has a slit or a through hole and has a first surface and a second surface opposite to each other, and the conductive pattern is disposed on the first surface. In addition, the tip has a base connected to the second surface and a pinpoint, which is disposed on the base, passes through the slit or the through hole, and protrudes from the first surface. The length, width and thickness of the metal line of the conductive pattern within the heating area can be different so as to adjust the resistance value of the conductive pattern for heating. When applying the current to the conductive pattern, the heating area can generate joule heat for totally heating the tip. Thus, the thermal probe of the present invention can be applied to scanning probe microscopy and other related fields.

In addition, the thermal probe of the present invention can select the optimum combination of "tip, conductive pattern and support element" based on the requirement, so that the tip can be replaced as it is worn or different function is needed, and the tip of different materials (not limit to a single material) and sizes can be used. Besides, in one embodiment of the present invention, the material of the tip is single crystal diamond, so that the thermal probe has the properties of high hardness, conductivity and duration. Thus, the tip can not be worn easily, so that the cost for the thermal probe can be reduced. Moreover, since the material of the pinpoint of the customized thermal probe has poor conductivity, the heating temperature of the customized thermal probe can not be increased and the pinpoint thereof is short and small. Thus, the heat generated by the heater is always lost during the conduction. The tip made of single crystal diamond can totally solve this problem.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
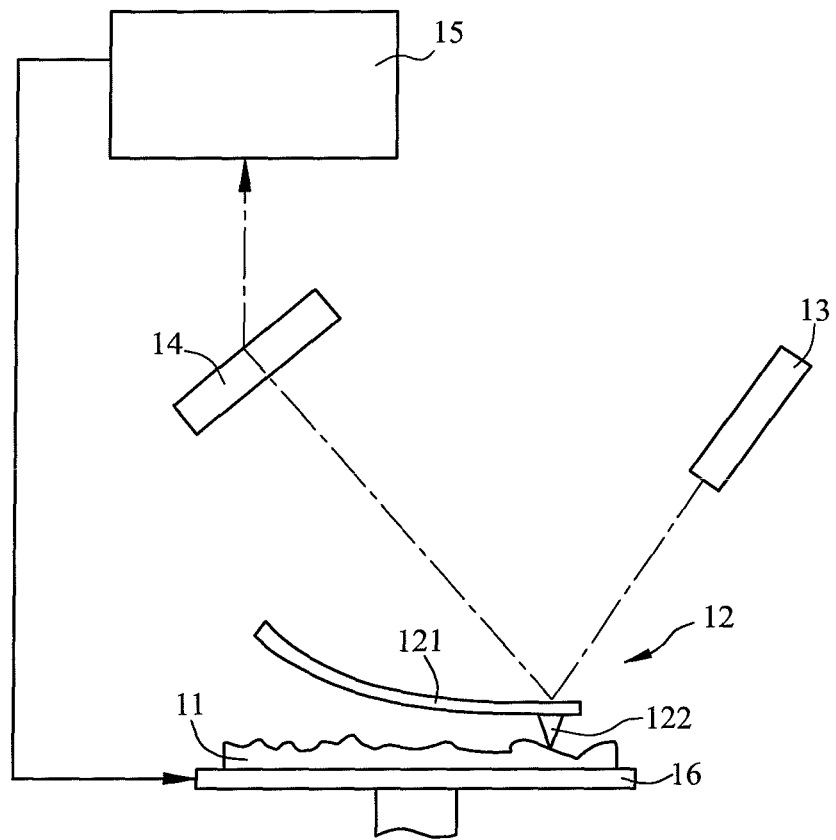
FIG. 1 is a schematic diagram showing a scanning probe to detect a sample surface.
Figure 2A:
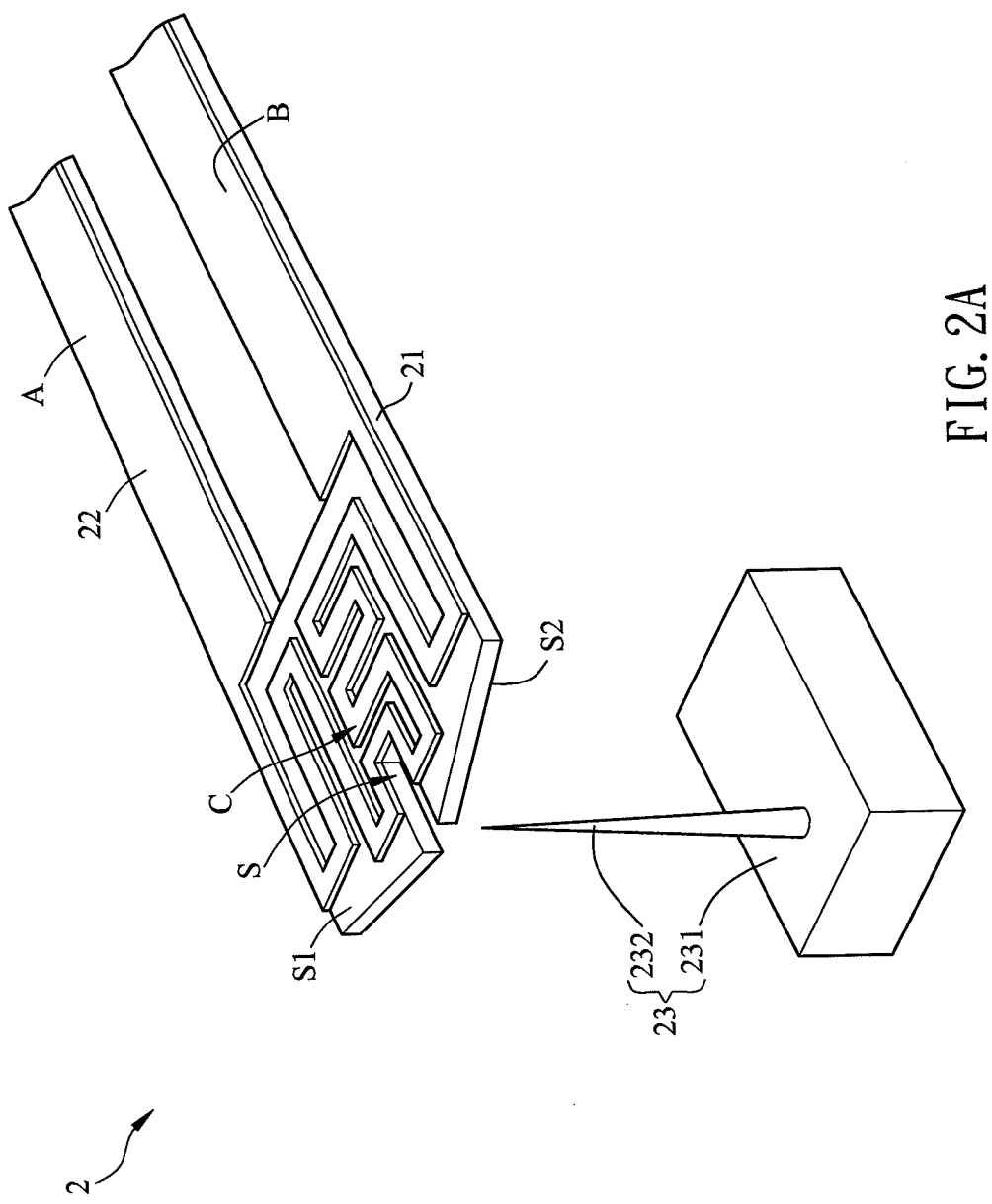
FIGS. 2A and 2B are an exploded view and an assembled view of a thermal probe according to an embodiment of the present invention.
Figure 2B:
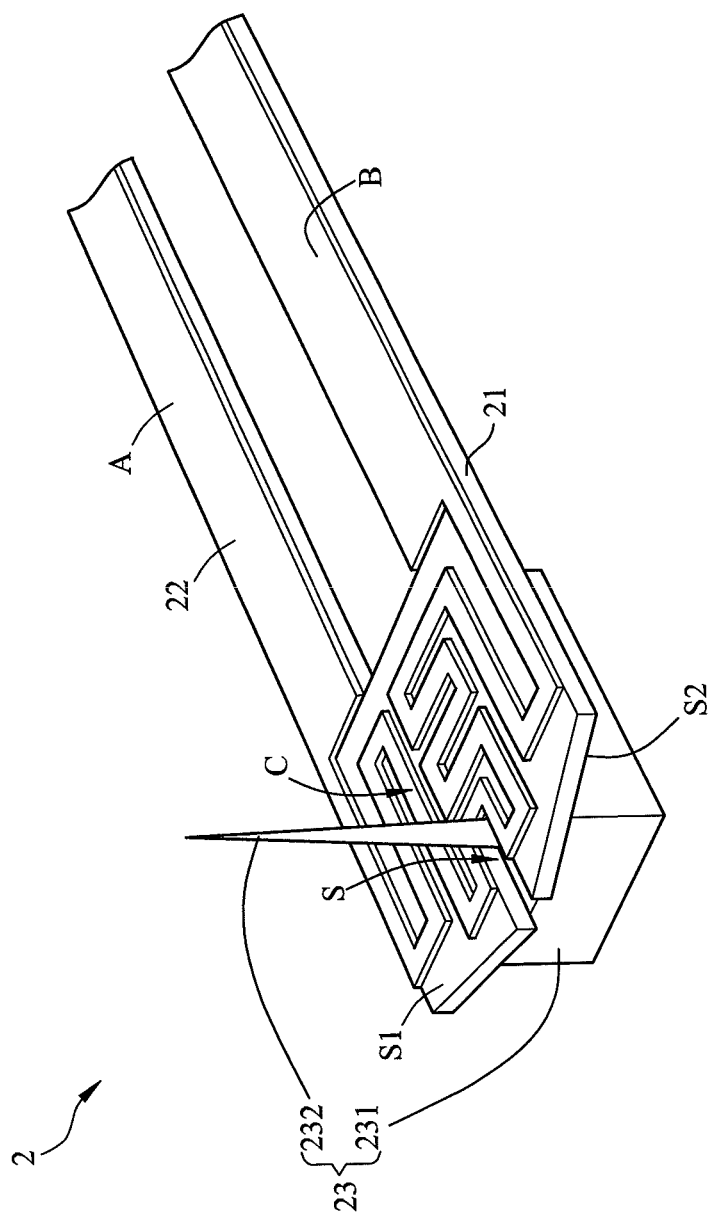

FIGS. 2A and 2B are an exploded view and an assembled view of a thermal probe 2 according to an embodiment of the present invention. The thermal probe 2 of the present invention can be applied to the thermal analyzing of micro-electronic elements, thermal mapping of non-homogeneous materials, data storage, near-field photothermal microspectroscopy, localized heating, and processing and modifying of micro-nano structures. The applicable fields of the thermal probe 2 of the present invention are not limited. The thermal probe 2 includes a support element 21, a conductive pattern 22 and a tip 23.

The support element 21 has a slit S or a through hole. Besides, the support element 21 has a first surface S1 and a second surface S2 opposite to each other. In this embodiment, the support element 21 has a slit S for example. The material of the support element 21 includes silicon, such as monocrystalline silicon. The size of the support element 21 is, for example but not limited to, 450×60×4 μm or 350×60×3 μm. Of course, the user can design and manufacture the support element 21 of different sizes depending on the requirement. The support element 21 can be manufactured by photolithography process (semiconductor processes), which may include photoresist coating, lithography, etching and removing photoresist steps. Since the photolithography process is well known, the details thereof will be omitted. In this embodiment, the support element 21 has two separate support arms A and B for example. The separate support arms A and B have a gap therebetween, so the air in the gap can prevent the heat energy loss through thermal conduction.

To be noted, the shape of the support element 21 is not limited to that shown in FIGS. 2A and 2B. Of course, the support element 21 with different shapes can be used depending on the requirement of user. For example, the support element may have a single support arm (not shown) instead of the separate support arms A and B as shown in FIGS. 2A and 2B. However, if a single support arm is used, the conductive patterns 22 on the support arm can not electrically coupled to each other.

The conductive pattern 22 is disposed on the first surface S1 of the support element 21 for forming a heating area C. In this case, the heating area C is defined as the portion of the conductive pattern 22 that is capable of heating the tip 23. The material of the conductive pattern 22 may include, for example but not limited to, Ni—P alloy, tungsten, platinum, carbon, Ni—Cr alloy, metal oxide (e.g. PbO or $RuO_2$), metal nitride (e.g. TaN), silicon (formed by ion implantation for providing resistance property), or any material with limited conductivity (or resistance). Accordingly, the user can design the length, width and thickness of the metal line of the conductive pattern 22 within the heating area C depending on the requirement, so as to adjust the resistance value of the conductive pattern 22. After applying the current to the conductive pattern 22, the heating area C can generate joule heat for totally heating the tip 23.

In this embodiment, as shown in FIGS. 2A and 2B, the width of the conductive patterns 22 of the support arms A and B is, for example but not limited to, 17.5 μm, and the width of the conductive patterns 22 within the heating area C is, for example but not limited to, 4 μm. Of course, the user can design and manufacture the conductive pattern 22 with different widths depending on the requirement. The conductive pattern 22 shown in FIG. 2A is for illustration only and, of course, the conductive pattern 22 can be other pattern.

The manufacturing process of the conductive pattern 22 may include thin-film deposition, ion implantation, or focused ion beam (FIB). The thin-film deposition can be performed by sputtering (e.g. Ultra-High Vacuum Ion Beam Sputtering, UHV-IBS), evaporation, or CVD (chemical vapor deposition) (e.g. Plasma-enhanced CVD, PECVD). Herein, ion implantation is to implant energized ions into the solid surface. FIB is to accelerate ion beam by electric field, focalize static electricity by lens, and drive the ions with high energy to hit the silicon substrate. In addition, by cooperating with different reaction gases, FIB can achieve both purposes of etching and evaporation.

In this embodiment, the conductive pattern 22 of the heating area C is defined by forming a metal thin film on the support element 21 by thin-film deposition and then etching the metal thin film. The material of the conductive pattern 22 of this embodiment comprises tungsten.

Referring to FIGS. 2A and 2B, the tip 23 has a base 231 and a pinpoint 232 disposed on the base 231. The base 231 and the pinpoint 232 can be integrally formed as one piece or separate components. The material of the tip 23 may include diamond, TiN, $Si_3N_4$, SiC, or non-conductive ceramic, polymer, complex compound, or their combinations. The above-mentioned materials all have high hardness, thermal conductivity and duration. Thus, the user can select the proper material to manufacture the tip 23 of the thermal probe 2 according to the requirement, and the tips 23 of different materials and sizes can be applied to the thermal probe 2. In this embodiment, the base 231 and the pinpoint 232 are integrally formed as one piece, and are made of single crystal diamond, which has superior properties of high hardness, thermal conductivity and duration. Since the material of the pinpoint of the customized thermal probe has poor conductivity, the heating temperature of the customized thermal probe can not be increased and the pinpoint thereof is short and small. Thus, the heat generated by the heater is always lost during the conduction. Fortunately, the tip 23 made of single crystal diamond can totally solve this problem. Besides, the material of the tip 23 is not limited to the above-mentioned examples.

For example, the conductive pattern 22 of the thermal probe 2 may have heating ability for melting the meltable material of the tip 23, so that the thermal probe 2 can be used as a nano- or micro-scaled hot-glue gun or spot welding gun.

Referring to FIG. 2B, the pinpoint 232 of the tip 23 is disposed on the base 231, passes through the slit S of the through hole, and protrudes from the first surface S1. In other words, the pinpoint 232 of the tip 23 passes the slit S from the back side of the support element 21 and then protrudes from the first surface S1, so that the base 231 and the second surface S2 are connected. In this case, the second surface S2 of the support element 21, which is located underneath the heating area C of the conductive pattern 22, serves as the connecting stage of the tip 23 for fixing the tip 23. It is possible to use a scan electronic microscope and micro robot arm to perform this operation. Thus, the tips 23 of different materials and sizes can be suitable for connecting to the second surface S2 of the support element 21. When the old tip 23 needs to be replaced due to wearing or different function, it is possible to replace it with another tip by separating the tip 23 from the second surface S2 of the support element 21 rather than replacing the entire thermal probe 2. Consequently, the cost for the thermal probe 2 can be reduced. In addition, the thermal probe 2 of the present invention can select the optimum combination of "tip, conductive pattern and support element" based on the requirement, so that the tip 23 can be replaced as it is worn or different function is needed, and the tip of different materials (not limit to a single material) and sizes can be used.

The thermal probe 2 may further include an adhesive layer (not shown) disposed between the base 231 and the second surface S2 for firmly connecting the tip 23 to the second surface S2 of the support element 21. For example, the adhesive layer can be a quick glue (Cyanoacrylate) or epoxy resin.

To be noted, the conductive pattern 22 may be in contact with the pinpoint 232 or not in contact with it. If the conductive pattern 22 is in contact with the pinpoint 232, the heating rate of the pinpoint 232 can be increased so as to reduce the heating time of the tip 23.

Figure 2D:
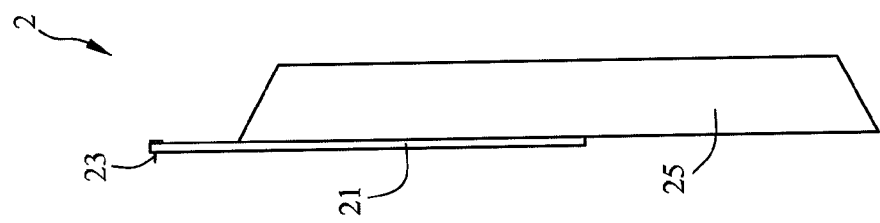
FIGS. 2C and 2D are other schematic diagrams of the thermal probe of the present invention.
Figure 2C:
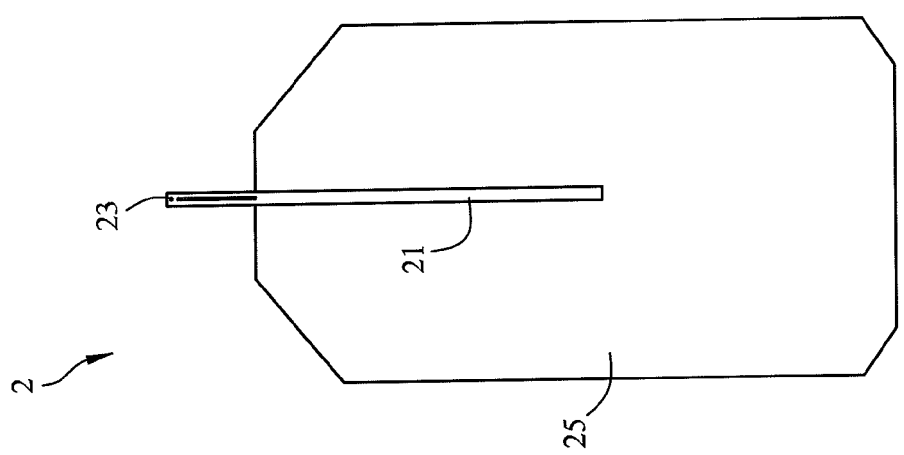

FIGS. 2C and 2D are other schematic diagrams of the thermal probe 2 of the present invention. As shown in FIGS. 2C and 2D, the thermal probe 2 further includes a pedestal 25. The support element 21 is disposed on and protrudes from the pedestal 25, and the tip 23 is located on one end of the support element 21 away from the pedestal 25. In this case, the pedestal 25 and the support element 21 can be integrally formed as one piece, and the material of the pedestal 25 may include silicon.

Figure 3:
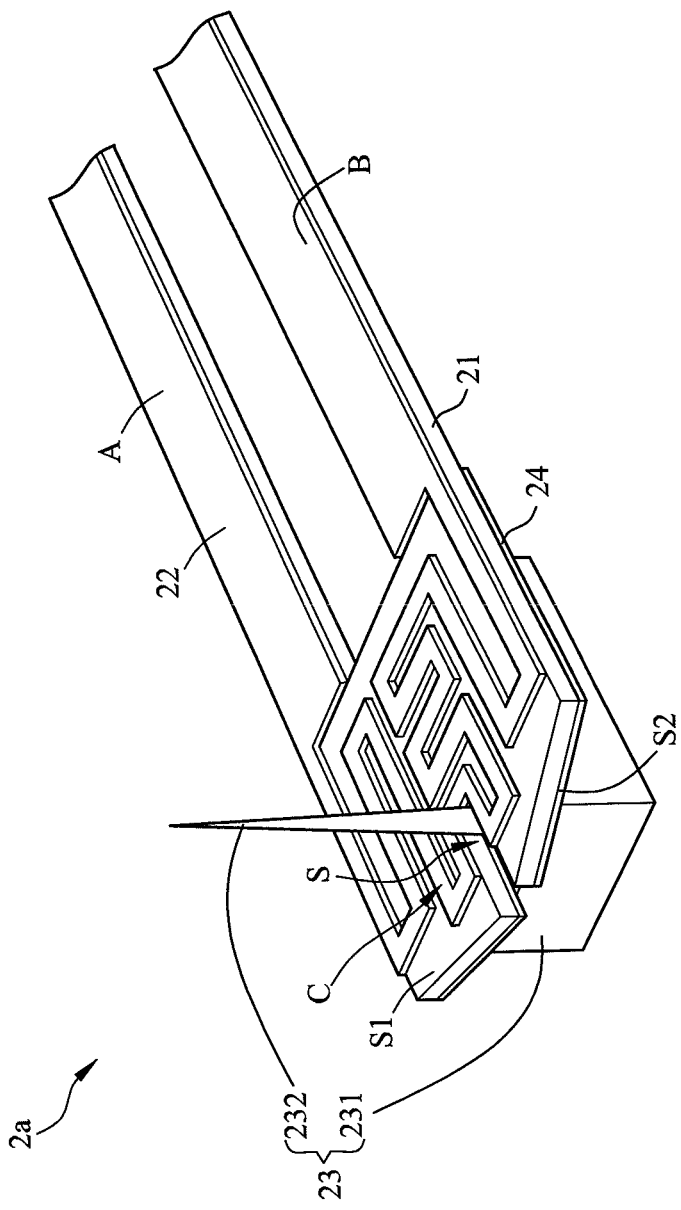
FIG. 3 is a schematic diagram showing another aspect of the thermal probe of the present invention.

FIG. 3 is a schematic diagram showing another aspect of a thermal probe 2a of the present invention.

Different from the above thermal probe 2, the thermal probe 2a may further include a heat isolation layer 24 disposed on the second surface S2. In this case, the thickness of the heat isolation layer 24 is, for example but not limited to, 1 μm.

Since the thermal duration of the adhesive layer is limited, the second surface S2 of the support element 21 is deposited with a heat isolation layer for preventing the separation issue between the base 231 and the second surface S2 of the support element 21 during the heating period. This configuration can also extend the lifespan of the thermal probe 2a. The heat isolation layer can be made of, for example, $Si_3N_4$, $SiO_2$, or other isolation materials.

Figure 4:
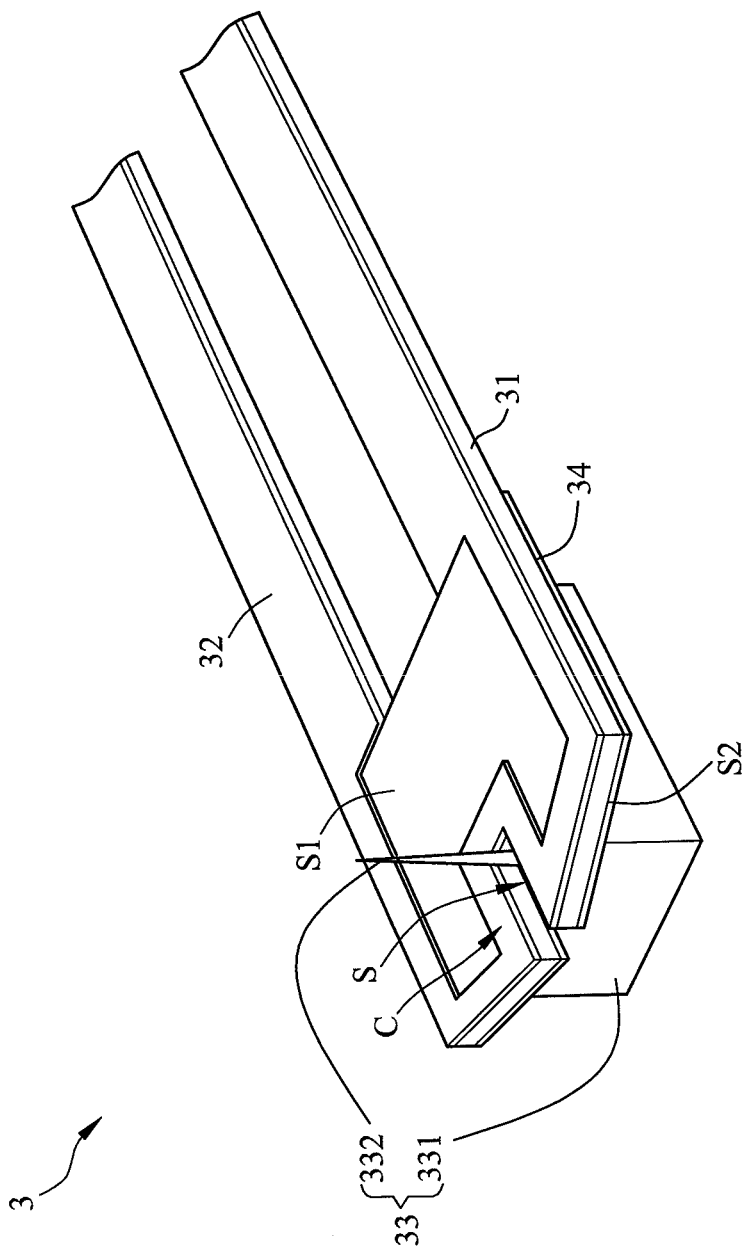
FIGS. 4 and 5 are schematic diagrams of a thermal probe according to another embodiment of the present invention.

FIG. 4 is a schematic diagram of a thermal probe 3 according to another embodiment of the present invention.

Referring to FIG. 4, the main difference between the thermal probes 3 and 2a is in that the conductive pattern 32 of the thermal probe 3 is manufactured by ion implantation, wherein the implantation depth of the conductive pattern 32 is 0.3 μm, and the layout of the conductive pattern 32 is different from that of the thermal probe 2a. Of course, the implantation depth and the layout of the conductive pattern 32 are not limited to the above examples.

Figure 5:
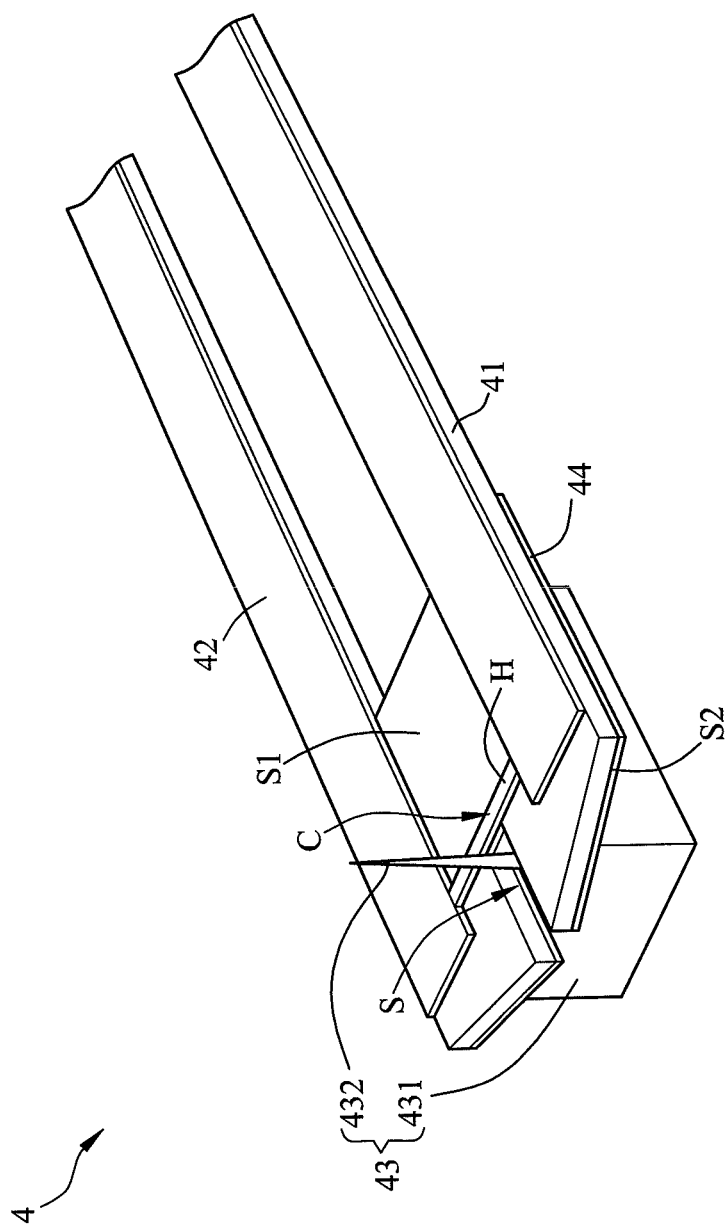

FIG. 5 is a schematic diagram of a thermal probe 4 according to another embodiment of the present invention.

Referring to FIG. 5, the main difference between the thermal probes 4 and 2a is in that the thermal probes 4 further includes a heat wire H disposed on the first surface Si and electrically connected with the conductive pattern 42. In this embodiment, the heat wire H is located in the heating area C and electrically connected to the conductive pattern 42, which is made of high conductivity material such as copper, silver or gold. In addition, the heat wire H may be in contact with the tip 43 or close to it for increasing the heating efficiency of the pinpoint 432. Besides, the material of the heat wire H may be tungsten.

Since the other technical features of the thermal probes 2a, 3 and 4 can be referred to those of the thermal probe 2, the detailed descriptions thereof are omitted.

As mentioned above, the length, width and thickness of the metal line of the conductive pattern 22/32 within the heating area C can be different so as to adjust the resistance value of the conductive pattern 22 for heating the thermal probe 2, 2a, 3 and 4. Otherwise, the thermal probe 2, 2a, 3 and 4 can be heated by the heat wire H. After applying the current to the conductive pattern 22/32, the heating area C can generate joule heat for totally heating the tip 23, 33 or 43. In addition, when the old tip 23, 33 or 43 needs to be replaced due to wearing or different function, it is possible to replace it with another tip by separating the tip 23, 33 or 43 from the support element 21, 31 or 41 rather than replacing the entire thermal probe 2, 2a, 3 or 4. Consequently, the cost for the thermal probe 2, 2a, 3 or 4 can be reduced. In addition, the thermal probe 2, 2a, 3 or 4 of the present invention can select the optimum combination of "tip, conductive pattern and support element" based on the requirement, so that the tip 23, 33 or 43 can be replaced as it is worn or different function is needed, and the tip of different materials (not limit to a single material) and sizes can be used.

To sum up, the thermal probe of the present invention includes a support element, a conductive pattern and a tip, the support element has a slit or a through hole and has a first surface and a second surface opposite to each other, and the conductive pattern is disposed on the first surface. In addition, the tip has a base connected to the second surface and a pinpoint, which is disposed on the base, passes through the slit or the through hole, and protrudes from the first surface. The length, width and thickness of the metal line of the conductive pattern within the heating area can be different so as to adjust the resistance value of the conductive pattern for heating. When applying the current to the conductive pattern, the heating area can generate joule heat for totally heating the tip. Thus, the thermal probe of the present invention can be applied to scanning probe microscopy and other related fields.

In addition, the thermal probe of the present invention can select the optimum combination of "tip, conductive pattern and support element" based on the requirement, so that the tip can be replaced as it is worn or different function is needed, and the tip of different materials (not limit to a single material) and sizes can be used. Besides, in one embodiment of the present invention, the material of the tip is single crystal diamond, so that the thermal probe has the properties of high hardness, conductivity and duration. Thus, the tip can not be worn easily, so that the cost for the thermal probe can be reduced. Moreover, since the material of the pinpoint of the customized thermal probe has poor conductivity, the heating temperature of the customized thermal probe can not be increased and the pinpoint thereof is short and small. Thus, the heat generated by the heater is always lost during the conduction. The tip made of single crystal diamond can totally solve this problem.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A thermal probe, comprising:
    a support element having a slit or a through hole, wherein the support element has a first surface and a second surface opposite to the first surface;
    a conductive pattern disposed at the first surface; and
    a tip having a base and a pinpoint disposed at the base, wherein the pinpoint passes through the slit or the through hole and protrudes from the first surface, and the base is connected with the second surface.

2. The thermal probe of claim 1, wherein the material of the conductive pattern comprises Ni—P alloy, tungsten, platinum, carbon, Ni—Cr alloy, metal oxide, metal nitride, or silicon.

3. The thermal probe of claim 1, wherein the manufacturing process of the conductive pattern comprises thin-film deposition, ion implantation, or focused ion beam (FIB).

4. The thermal probe of claim 1, wherein the material of the tip comprises diamond, TiN, Si3N4, SiC, or their combinations.

5. The thermal probe of claim 1, wherein the base and the pinpoint are integrally formed as one piece.

6. The thermal probe of claim 1, wherein the pinpoint is in contact with the conductive pattern.

7. The thermal probe of claim 1, wherein the tip is replaceable.

8. The thermal probe of claim 1, further comprising:
    an adhesive layer disposed between the base and the second surface.

9. The thermal probe of claim 1, further comprising:
    a heat isolation layer disposed on the second surface.

10. The thermal probe of claim 1, further comprising:
    a heat wire disposed on the first surface and electrically connected with the conductive pattern.

* * * * *